(12) United States Patent
Yeger et al.

(10) Patent No.: US 12,099,415 B2
(45) Date of Patent: Sep. 24, 2024

(54) DEVICES AND METHODS FOR FAST BACKUP

(71) Applicant: Huawei Technologies Co., Ltd., Shenzhen (CN)

(72) Inventors: Asaf Yeger, Hod Hasharon (IL); Aviv Kuvent, Hod Hasharon (IL); Assaf Natanzon, Hod Hasharon (IL); Yaron Mor, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 17/902,658

(22) Filed: Sep. 2, 2022

(65) Prior Publication Data

US 2022/0413968 A1 Dec. 29, 2022

Related U.S. Application Data

(63) Continuation of application No. PCT/EP2020/055603, filed on Mar. 4, 2020.

(51) Int. Cl.
*G06F 12/00* (2006.01)
*G06F 3/06* (2006.01)
*G06F 11/14* (2006.01)

(52) U.S. Cl.
CPC ........ *G06F 11/1458* (2013.01); *G06F 3/0619* (2013.01); *G06F 3/0644* (2013.01); *G06F 3/065* (2013.01); *G06F 3/0676* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,370,025 B1 * | 5/2008 | Pandit | G06F 16/184 707/610 |
| 8,775,377 B1 | 7/2014 | Zhang et al. | |
| 2009/0199199 A1 | 8/2009 | Pooni et al. | |
| 2022/0147541 A1 * | 5/2022 | Mallipeddi | G06F 3/067 |

FOREIGN PATENT DOCUMENTS

EP 3026562 A1 6/2016

* cited by examiner

*Primary Examiner* — Daniel D Tsui
(74) *Attorney, Agent, or Firm* — Leydig, Voit & Mayer, Ltd.

(57) ABSTRACT

A backup entity and a method for backing up a disk volume of a production device are provided. The backup entity is configured to: create a first backup image of the disk volume, in a backup repository. Further, the backup entity is configured to obtain a first indication from the production device, wherein the first indication is indicative of a first operation to be performed by the production device on the disk volume. The backup entity is further configured to perform the first operation on the first backup image, to obtain a second backup image in the backup repository. According to the application, a solution to mimic an operation that changes data of a production storage, in a backup system, is provided, which can reduce the amount of data sent from the production storage to the backup system and thus reduce a backup window.

19 Claims, 5 Drawing Sheets

DEVICES AND METHODS FOR FAST BACKUP

CROSS-REFERENCE TO RELATED APPLICATIONS

This application is a continuation of International Application No. PCT/EP2020/055603, filed on Mar. 4, 2020, the disclosure of which is hereby incorporated by reference in its entirety.

TECHNICAL FIELD

Embodiments of the present disclosure relate to the field of computer systems with backup mechanisms, in particular, to an improved backup method. Embodiments of the disclosure also allow backing up a computer system in a fast and efficient manner. To this end, embodiments of the present disclosure provide a backup entity, a backup system and a method for fast backing up data.

BACKGROUND

From time to time, customers may run a tool that performs many I/O operations and changes disk data, files, software programs and operating systems. Examples of such operations include full disk encryption, operation system (OS) and programs upgrades, disk defragmentation, application maintenance, defragmentation and repairs. Since such operations perform many I/O operations and change the disk data, they may cause a longer backup window and a performance decrease of production servers on the next backup of that disk. Typically, a backup window refers to the time slot/window when it is most suitable to back up data, applications or a system. It is a predefined or prescheduled time when the backup software is permitted to start the backup process on a computer system. For instance, a virtual machine (VM) snapshot is bigger and thus takes more time to backup. This means that, this VM snapshot will exist for a longer period of time (since it's required for the backup), and it reduces VM performance during this period. In addition, the aforementioned operations may cause a loaded network traffic, because a lot of data is being sent to the backup server.

Usually upon an operation that perform many writes to the disk, the backup system performs a regular backup that might be a full disk backup. Alternatively, if the backup system detects data changes of more than a certain percentage, it can start the backup task sooner. In both cases, all the changes will be transferred to the repository during one long backup process or a couple of short backups.

SUMMARY

In view of the above-mentioned challenges, embodiments of the invention aim to provide a backup entity and method for backing up a production device in a fast and efficient manner. An objective is, in particular, to fast back up the production device, in a scenario where an operation including many I/O operations and changes on disk data is going to be performed on the production device. One aim is to not pass all the data after the operation, to the backup entity. Further, it is also desirable to reduce the backup window.

The objective is achieved by the embodiments of the invention as described in the enclosed independent claims. Advantageous implementations of the embodiments of the invention are further defined in the dependent claims.

A first aspect of the present disclosure provides a backup entity for backing up a disk volume, wherein the disk volume is of a production device, wherein the backup entity is configured to: create a first backup image, of the disk volume, in a backup repository; obtain a first indication from the production device, wherein the first indication is indicative of a first operation to be performed by the production device on the disk volume; and perform the first operation on the first backup image, to obtain a second backup image in the backup repository.

This disclosure accordingly proposes to mirror operations that are going to be performed on the production device, in the backup repository. In particular, the operations may be those, which will make a lot of changes on the disk. Thereby, when creating a new backup, the backup entity may already consider such expected future changes. Thus, the production device can be backed up faster and more efficiently, in particular in a scenario where an operation is going to be performed on the production device.

The backup entity can identify the first operation based on the first indication. The first indication may include a name of the first operation, and/or may include a predetermined ID of the first operation, and/or may include base parameters of the first operation. The second backup image may be the first backup image, on which the first operation was performed.

In an implementation form of the first aspect, the backup entity is further configured to obtain a first snapshot of the disk volume from the production device; and backup the first snapshot to create the first backup image of the disk volume in the backup repository.

In an implementation form of the first aspect, the device is further configured to perform chunking on the second backup image to obtain a first set of chunks; and calculate a hash value for each chunk in the first set of chunks, to obtain a first set of hash values.

Notably, a hash value can be used to uniquely identify a respective chunk.

In an implementation form of the first aspect, the device is configured to obtain, after the first operation is performed by the production device, a second snapshot of the disk volume from the production device, perform chunking on the second snapshot to obtain a second set of chunks; and calculate a hash value for each chunk in the second set of chunks, to obtain a second set of hash values.

Notably, after the previous backup and before the first operation is performed, new data may also be written in the production device. That is, the chunks/hash values of the second snapshot on the production device are not necessarily the same as the chunks/hash values of the second backup image on the backup repository.

In an implementation form of the first aspect, performing the chunking on the second snapshot comprises instructing the production device to perform the chunking on the second snapshot, to obtain the second set of chunks.

In an implementation form of the first aspect, the device is configured to: compare the first set of hash values and the second set of hash values; determine a third set of hash values, wherein the third set of hash values comprises hash values that are in the second set of hash values but are not in the first set of hash values; and add chunks associated with the hash values in the third set of hash values to the second backup image, to obtain a third backup image in the backup repository.

That is, the third set of hash values may relate to new/different chunks/data, which does not yet exist like this at the backup repository, at this time. Only the new data may be backed up at the backup repository, thus reducing the amount of data to transfer and store.

In an implementation form of the first aspect, the first operation comprises one of the following operations: disk encryption, program upgrade, disk defragmentation, and application maintenance.

These operations are heavy I/O operations that would change a huge amount of data in the disk.

In an implementation form of the first aspect, the first indication comprises an encryption key and an encryption algorithm.

In a case that the first operation is to encrypt the disk, an encryption key and an encryption algorithm that going to be used in the production device is required.

A second aspect of the present disclosure provides a backup system comprising a backup entity according to the first aspect or one of the implementation form of the first aspect, and the backup repository.

In an implementation form of the second aspect, the backup system further comprises the production device.

In an implementation form of the second aspect, the production device is configured to create the first snapshot of the disk volume, before the first operation is performed.

In an implementation form of the second aspect, wherein the production device is further configured to: perform the first operation on the disk volume; and create the second snapshot of the disk volume after the first operation is performed.

A third aspect of the present disclosure provides a method for backing up a disk volume, wherein the disk volume is of a production device, wherein the method comprises: creating a first backup image, of the disk volume, in a backup repository; obtaining a first indication from the production device, wherein the first indication is indicative of a first operation to be performed by the production device on the disk volume; and performing the first operation on the first backup image, to obtain a second backup image in the backup repository.

In an implementation form of the third aspect, the method further comprises: obtaining a first snapshot of the disk volume from the production device; and backing up the first snapshot to create the first backup image of the disk volume in the backup repository.

In an implementation form of the third aspect, the method further comprises: performing chunking on the second backup image to obtain a first set of chunks; and calculating a hash value for each chunk in the first set of chunks, to obtain a first set of hash values.

In an implementation form of the third aspect, the method further comprises: obtaining, after the first operation is performed by the production device, a second snapshot of the disk volume from the production device, performing chunking on the second snapshot to obtain a second set of chunks; and calculating a hash value for each chunk in the second set of chunks, to obtain a second set of hash values.

In an implementation form of the third aspect, performing the chunking on the second snapshot comprises instructing the production device to perform the chunking on the second snapshot, to obtain the second set of chunks.

In an implementation form of the third aspect, the method further comprises: comparing the first set of hash values and the second set of hash values; determining a third set of hash values, wherein the third set of hash values comprises hash values that are in the second set of hash values but are not in the first set of hash values; and adding chunks associated with the hash values in the third set of hash values to the second backup image, to obtain a third backup image in the backup repository.

In an implementation form of the third aspect, the first operation comprises one of the following operations: disk encryption, program upgrade, disk defragmentation, and application maintenance.

In an implementation form of the third aspect, the first indication comprises an encryption key and an encryption algorithm.

The method of the third aspect and its implementation forms provide the same advantages and effects as described above for the device of the first aspect and its respective implementation forms.

A fourth aspect of the present disclosure provides a computer program comprising a program code for carrying out, when implemented on a processor, the method according to the second aspect or any of its implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which.

DETAILED DESCRIPTION OF EMBODIMENTS

Illustrative embodiments of method, device, and program product for efficient packet transmission in a communication system are described with reference to the figures. Although this description provides a detailed example of possible implementations, it should be noted that the details are intended to be exemplary and in no way limit the scope of the application.

Moreover, an embodiment/example may refer to other embodiments/examples. For example, any description including but not limited to terminology, element, process, explanation and/or technical advantage mentioned in one embodiment/example is applicative to the other embodiments/examples.

Figure 1:
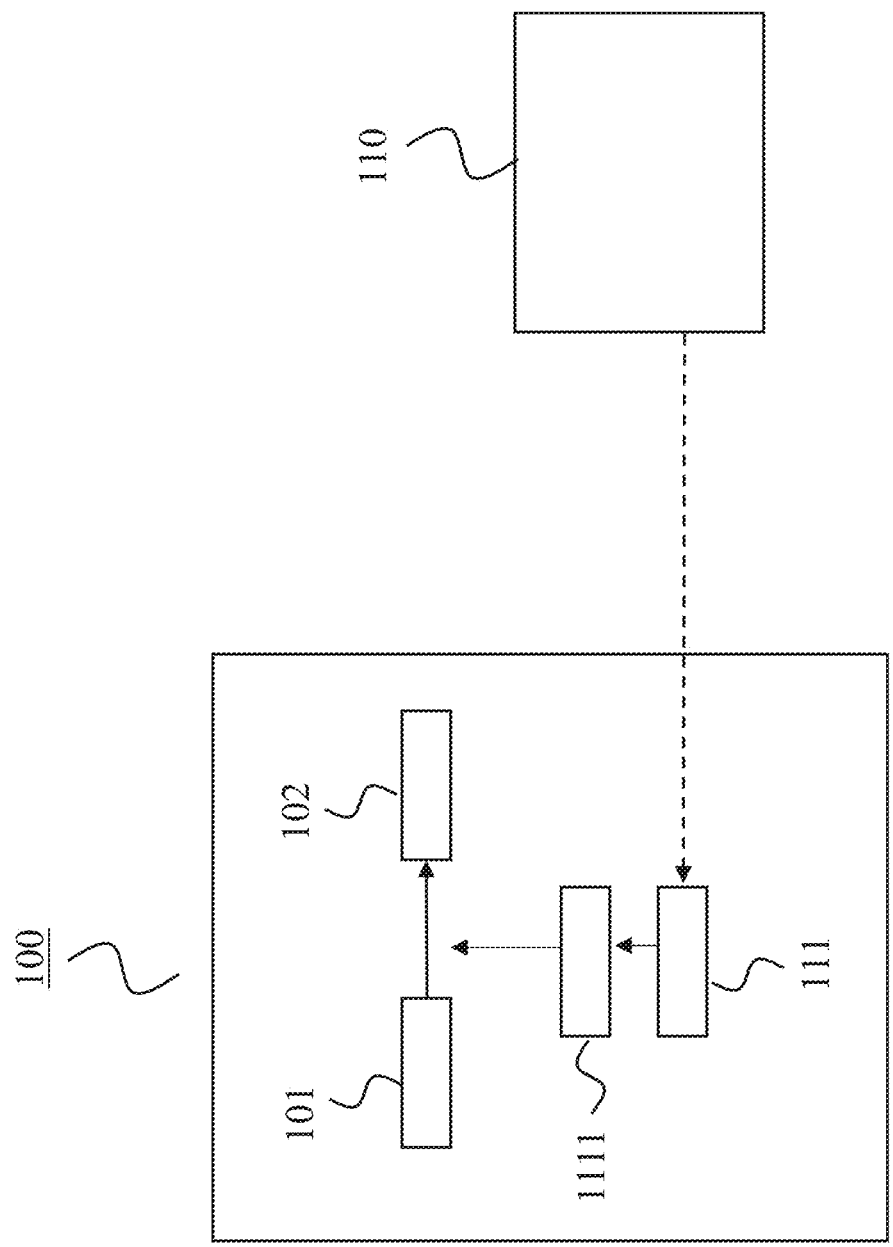
FIG. 1 shows a backup entity according to an embodiment of the invention.

FIG. 1 shows a backup entity 100 according to an embodiment of the invention. The backup entity 100 is adapted for backing up a disk volume, wherein the disk volume is of a production device 110. In particular, the backup entity 100 is configured to create a first backup image 101 of the disk volume, in a backup repository. The backup entity 100 is further configured to obtain a first indication 111 from the production device 110. In particular, the first indication 111 is indicative of a first operation 1111 to be performed by the production device 110 on the disk volume. Further, the backup entity 100 is configured to perform the first operation 1111 on the first backup image 101, to obtain a second backup image 102 in the backup repository.

Notably, the backup entity 100 may be a backup application. The backup application may be installed on the production device 110, or on another device in the system. The backup entity 100 could also comprise the backup repository. Optionally, the backup repository may be an external storage device, i.e., external to the backup entity 100 and/or production device 110.

Possibly, the backup entity 100 may be adapted to back up the whole disk of the production device 110. Optionally, the backup may be applied in a granularity of a volume like C:\, D:\ in the disk of the production device 110 (for instance, when it is used for Windows operation systems), or a partition of the disk of the production device 110 (for instance, in Linux systems).

The backup entity 100 may comprise processing circuitry (not shown) configured to perform, conduct or initiate the various operations of the backup entity 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the backup entity 100 to perform, conduct or initiate the operations or methods described herein.

This disclosure proposes to mirror operations which change a significant part of the disk in the backup repository, thereby to create a new backup which already includes such expected future changes.

In particular, according to an embodiment of the invention, the backup entity 100 may be configured to obtain a first snapshot of the disk volume from the production device 110. The backup entity 100 may be further configured to back up the first snapshot to create the first backup image 101 of the disk volume in the backup repository.

Optionally, according to an embodiment of the invention, the backup entity 100 may be further configured to perform chunking on the second backup image 102 to obtain a first set of chunks; and calculate a hash value for each chunk in the first set of chunks, to obtain a first set of hash values.

Notably, chunking is a process to split a file into smaller pieces called chunks by chunking algorithms. It can help to eliminate duplicate copies of repeating data on storage. A chunk is usually a smaller granularity of block. That is, the block may be split to a number of chunks. There is no limitation for a chunk size equals to a block size, but it will be less effective in implementations. In general, in a backup application a block is of size of 4K-4M (depend on the backup application), while the smallest unit of I/O is a sector which is 512 byte for hard disk drive. Conventionally, upon 1 sector that was changed, the backup application will mark as 1 block that was changed, let's say size of 4M. Instead of calculating hash values of a whole block (e.g., of size 4M), this invention proposes to split the block to chunks (e.g., of size 16K, in this example: 16K*256 number of chunks=4M). Thus, hash values are calculated per 16K chunk and not for the entire 4M at once. So basically hash calculation for blocks and chunks are different by their granularity.

A hash value of a chunk can be obtained by performing a hash function or hash algorithm on the data chunk. The hash value can be used to uniquely identify respective chunk. It should be understood that, different types of hash algorithms or functions may be applied to obtain the hash value in this invention. This is not specific limited in embodiments of the invention.

Optionally, according to an embodiment of the invention, the backup entity 100 may be configured to obtain, after the first operation 1111 is performed by the production device 110, a second snapshot of the disk volume from the production device 110. The backup entity 100 may be further configured to perform chunking on the second snapshot to obtain a second set of chunks. Then, the backup entity 100 may be configured to calculate a hash value for each chunk in the second set of chunks, to obtain a second set of hash values.

Notably, the second snapshot is created at a time point later than the first snapshot being created. The first operation 1111 may be an operation that performs many I/O operations and changes the disk data, files, software programs and the operating system. That means, a huge number of data on the disk will be changed after the first operation 1111.

In particular, according to an embodiment of the invention, performing the chunking on the second snapshot may also comprise instructing the production device 110 to perform the chunking on the second snapshot, to obtain the second set of chunks.

With the knowledge of the two sets of hash values (the first and the second set of hash values, according to previous embodiments), optionally, according to an embodiment of the invention, the backup entity 100 may be configured to compare the first set of hash values and the second set of hash values. The backup entity 100 may be further configured to determine a third set of hash values, wherein the third set of hash values comprises hash values that are in the second set of hash values but are not in the first set of hash values. Then, the backup entity 100 may be configured to add chunks associated with the hash values in the third set of hash values to the second backup image 102, to obtain a third backup image 103 in the backup repository.

It should be understood that, the third set of hash values relates to new data. The new data refers to data that has been added to the disk at the production device 110 after the first snapshot was created, but before the first operation 1111 is performed. That is, the new data does not exist at the backup repository.

Based on the aforementioned embodiments, it can be seen that, the backup entity 100 may verify if these hash values (of the chunks) exist in the backup repository. If not, then the backup entity 100 needs to request these data from the production device 110, and store these data and hash values in the backup repository. Otherwise, if the hash values already exist, there are no need to transfer these data between the production device 110 and the backup repository. In this way, as a result of pre-performing the first operation 1111 in the backup repository with the same algorithm, key chunk size and hash algorithm, most of the hash values already exist, thus the amount of data need to be sent from the production network (the production device 110) to the infrastructure network (the backup repository) is significantly reduced.

In a scenario that an operation, such as disk encryption, will be performed on a production server at 20:00, and backup of this server is scheduled at 22:00. The previous backup was performed at 19:00. On the backup server, the same operation, that is, encryption of the backup of the disk (the one performed at 19:00) will be performed, particularly with the same key, which is to be used in the production-side encryption at 20:00. The result of the backup server side encryption will be saved on the backup server. At 22:00, when the next backup occurs, the disk in the production server and the result of the backup server side encryption are both chunked and hashed (particularly using the same chunking and hashing algorithms). The hash values are then communicated between the production server and the backup server (either the production server sends its hash values to the backup server or vice versa), and are used to determine which chunks of data were changed. These chunks of data are then passed to the backup server, and together with the non-changed pre-computed backup server-side encrypted chunks, they constitute the backup of 22:00.

It should be noted that, the encryption of the backup disk is being performed before the next backup occurs. That is to prevent transferring all the data that was encrypted. So when a backup system performs a cyclic redundancy check on the blocks\chunks, it will recognize data already exists and will reduce network load. As a result, only the changed hash values and the chunks are passed to the backup system, which is significantly less data than a full disk backup used in a conventional manner.

In the following, an embodiment of the present invention is described in detail. In this case, a disk encryption is used as an example of the first operation 1111, not a limitation.

Figure 2:
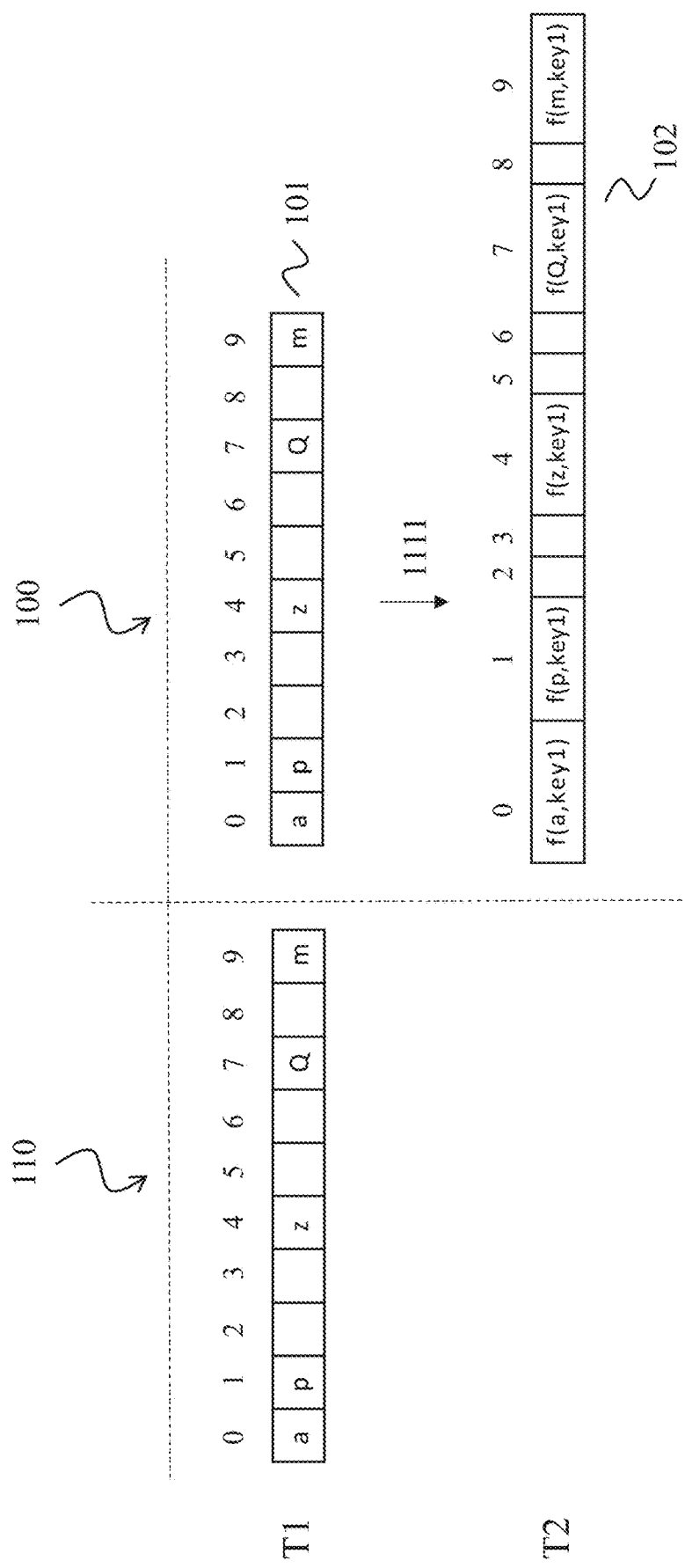
FIG. 2 shows diagrams of a production device and a backup entity according to an embodiment of the invention.
Figure 3:
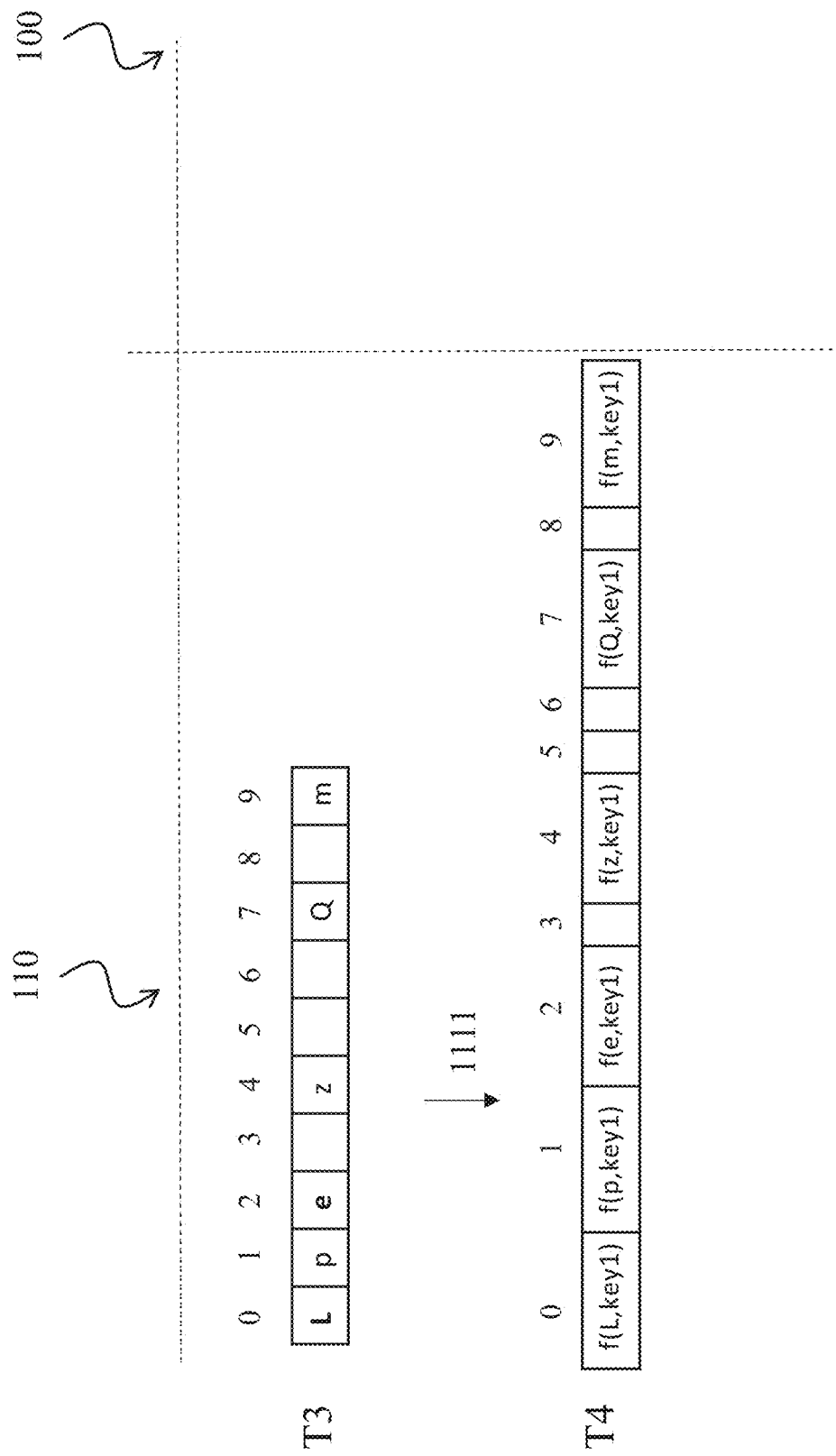
FIG. 3 shows diagrams of a production device and a backup entity according to an embodiment of the invention.

1. VM1 has a disk (disk1) with a size of 100 G.
2. At time T1, a snapshot of VM1 occurs and it is backed up to a backup server.
3. The backup repository has now a backup of VM1, called snap1 (i.e, the first backup image 101 in FIG. 1 and FIG. 2), which represents VM1 at time T1.
4. At time T2, a user knows that he wants to encrypt the data in VM1 with algorithm E1, so he supplies the backup application with a key (key1) to encrypt the latest backup and specifies that an encryption algorithm to be used is algorithm E1.
5. The backup application encrypts (performs the first operation 1111 as shown in FIGS. 1 and 2) VM1 disk (i.e. the first backup image 101) in the backup repository with algorithm E1 and key1 (received from the user). This is to obtain the second backup image 102 as shown in FIG. 1 and FIG. 2.
6. The backup application further performs chunking of the changed blocks, calculates hash values for each chunk.
7. At time T3, the production server data was changed due to some writes.
8. At time T4, the user encrypts VM1 data (disk1) with key=key1 (that is to perform the first operation 1111 as shown in FIGS. 1 and 3).
9. A backup of VM1 starts and a snapshot of the VM occurs at time T5.
10. The backup application performs chunking of the changed blocks and calculates hash values for each chunk in the production server.
11. The backup application verifies if these hash values (of the chunks) exist in the backup repository. If not, than it needs to send to the backup repository their data and hash values and to store them. Otherwise (if the hash exists), there's no need to send its data.
12. As a result of pre-performing the disk encryption operation in the backup repository with the same algorithm, key chunk size and hash algorithm, most of the hash values already exist and no need to send their data.
13. The result is that mostly hash values are passed on the network, and the data of the writes of time T4. Backup operation is completed much faster and VM snapshot is deleted sooner which improves VM performance.

FIG. 2 and FIG. 3 show diagrams of a production device 110 and a backup entity 100 according to an embodiment of the invention. Notably, FIG. 2 and FIG. 3 are consecutive. In this embodiment, after T2, the encryption (using key1) is performed on the first backup image 101 as shown in FIG. 2. As a result, all the blocks that contain data will be changed (in this example, blocks 0, 1, 4, 7 and 9). These blocks will be calculated (for hash values) and their hash values will be saved. Notably, the second image 102 is actually created at a time point later than T2.

It should be understood that, the encryption process on the backup entity 100 can be performed before or after, the encryption process on the production device 110. However, it must be performed before a new backup occurs in order to prevent transferring all the data that has been encrypted.

As shown in FIG. 3, at T3, new data has been written on blocks 0 and 2 (in block 0, "a" was changed to "L"; in block 2, new data "e" was written). Further, at T4, after the encryption process is performed on the production device 110, all the blocks that contain data will be changed (in this example, blocks 0, 1, 2, 4, 7 and 9).

According to this embodiment, hash values for the changed blocks 0, 1, 2, 4, 7 and 9 will be calculated. The backup entity 100 may further verify which hash values exist in the backup repository. In this specific embodiment, only block 0 and block 2 (data which is: f(L, key1)+f(e, key1)) will be passed to the backup entity 100.

Further, according to an embodiment of the invention, the backup entity 100 may comprise an application installed on the production device 110. The application may be an in-guest application (inside the production device 110) that is able to identify heavy I/O operations, and to notify the backup entity 100. In particular, the backup entity 100 may be configured to receive the first indication 111 by means of the application.

In this embodiment, the backup system\Administrator is not aware of the heavy I/O operation which is going to happen in the production server (VM or physical) due to user operations. The in-guest application/agent provides the first indication 111 to the backup entity 100, in order to enable mimicking (mirroring) the same operation in the backup repository.

Optionally, according to embodiments of the invention, the first operation 1111 may comprise one of the following operations: disk encryption, program upgrade, disk defragmentation, and application maintenance.

Disk defragmentation is the process of consolidating fragmented files on the user's hard drive. Files become fragmented when data is written to disk, and there is not enough contiguous space to hold the complete file. Storage algorithms break the data apart so that it will fit into the available space.

Optionally, according to embodiments of the invention, the first indication 111 may comprise an encryption key and an encryption algorithm. Notably, when the first operation 1111 is a disk encryption, the encryption key and the encryption algorithm, which are used in the production device 110, are needed for the backup entity 100 to mimic the disk encryption.

It should be understood that, in order to use an in-guest agent, the following issues should be considered: deployments of the agent, identification of heavy I/O operations, communication between the agent and the backup system, and the flow of the first backup after the heavy write operation in the production server.

The deployments of the in-guest agent consider hypervisors environments and physical server environments.

Today, modern hypervisors support a variety of in-guest operations, such like: injecting an agent, running the agent, getting a respond, monitoring the agent, get VM resources, etc. So basically a backup system can inject the agent to run in the production server upon first full backup. In this way, it can be deployed automatically in large scale of VMs without manually intervention. As an example, vSphere Guest software development kit (SDK) provides such in-guest functionality and more. As a result, all communication with the agent are not via direct TCP communication (on some open port) in the VM, but via the Hypervisor application programming interface (API) which is safer. However, a limitation is that, it requires login credentials of the VM and VMware tools running in each guest.

With respect to physical server environments, in order to deploy such in-guest solution, the backup system should have full access to the physical server in order to inject, run and monitor the agent. Like in hypervisor solution, upon first full backup of the machine, it will inject the agent to the production server. In addition, customer network should be configured to allow communication from the backup system (infrastructure network) to the server (production network), so the backup system can communicate directly (TCP communication) with the "injected" agent.

There may be an agent for Linux and an agent for Windows, therefore an OS type should be known to the backup system to inject the correct agent. This is solved by supplying the backup system the credentials and the OS type. In addition, for hypervisors the backup system can get the OS type by using the Guest SDK API. In this case the VMware tools will supply the information "from inside" to the "Guest API".

Once the agent is running inside the production server, the identification of heavy I/O operations is the same for VM or physical server. For instance, the agent can identify a defragmentation that is running in Windows by monitoring the event viewer, for Linux it can monitor the /var/log/ messages which record a variety of events. Notably, the agent can "catch" the event when the defragmentation starts to run on volume "X", or if for example exchange defragmentation starts to run on the application database, by monitoring the relevant event. This is just one example and there may be more ways to detect such operations from in-guest.

In general, for each OS the agent will support a set of applications to detect such heavy I/O operations. For encryption operation (disk\VM), the agent should be integrated with the encryption system that is running in-guest. This aims to not only identify that the encryption is running, but also to get the algorithm and key.

For hypervisors, the agent may update the backup system via the hypervisor API; in physical environment, the agent may update the backup system via direct TCP communication. For operations such as defragmentation, the agent may notify the backup system that operation started on which volume\partition or application (some database file). For operation like encryption the agent may supply the backup system the algorithm, key and on which partition of the disk(s) it is running.

Once the first backup started after the mirroring operation is completed, the backup system will notify the in-guest agent to perform internal snapshot (not hypervisor snapshot). For example in Windows the agent can perform volume shadow service (VSS) snapshot, and for Linux it can perform logical volume manager (LVM) snapshot. Once the snapshot has been created, the agent will chunk the snapshot, calculate the hash values and update the backup system for each chunk its hash. In this way, only hash values will pass from the production network to the infrastructure (backup system) network. For each hash that already exists in the backup repository, only some metadata update will occur. For new hash that doesn't exist in the backup repository, the backup system will request the agent to send the data of that chunk. Such solution works for both physical and virtual environments.

To summarize the in-guest solution, the agent will be "tailored wised" per each OS type and application that perform heavy write in the production server, in order to identify the operation and supply the relevant information to the backup system to perform the mirroring. In addition, such solution reduces the amount of data sent from the production network (where the production server exist) to the infrastructure network (backup system).

In one specific embodiment, the entire flow for virtual environment (VM with OS type: Windows) can be described as:
 1. A backup system is configured to perform backup of server1 and to receive the server credentials.
 2. The backup system checks the OS type via Guest API.
 3. The backup system injects an agent to the guest.
 4. The backup system performs a regular VM backup.
 5. A user decides to run disk fragmentation.
 6. The agent, that monitors the event viewer, recognizes that disk defragmentation started on all the disks.
 7. The agent updates the backup system that defragmentation is running on all server1 disks.
 8. The backup system mimics this operation, i.e., the defragmentation, on server1 backup repository.
 9. Mirror operation on the backup system is completed.
 10. The backup system policy triggers another backup.
 11. The backup system is aware that mirroring operation had occur, thus instead of performing a "regular backup", it requests the agent to perform on internal snapshot (using VSS).
 12. The agent notifies the backup system that snapshot has been created successfully.
 13. The backup system asks the agent to send hash values of all the snapshot chunks.
 14. For each hash, the backup system updates in the backup repository the metadata in case it is already exist, otherwise it requests the agent to send the chunk data and save it in the backup repository.
 15. Once the first backup after the mirroring operation is successfully completed, the backup system updates server1 backup metadata so next backup should be a "regular backup" (without the agent assistance).
 16. According to the policy, a new backup is triggered, this time the backup will be performed in a regular method without using the agent.

Figure 4:
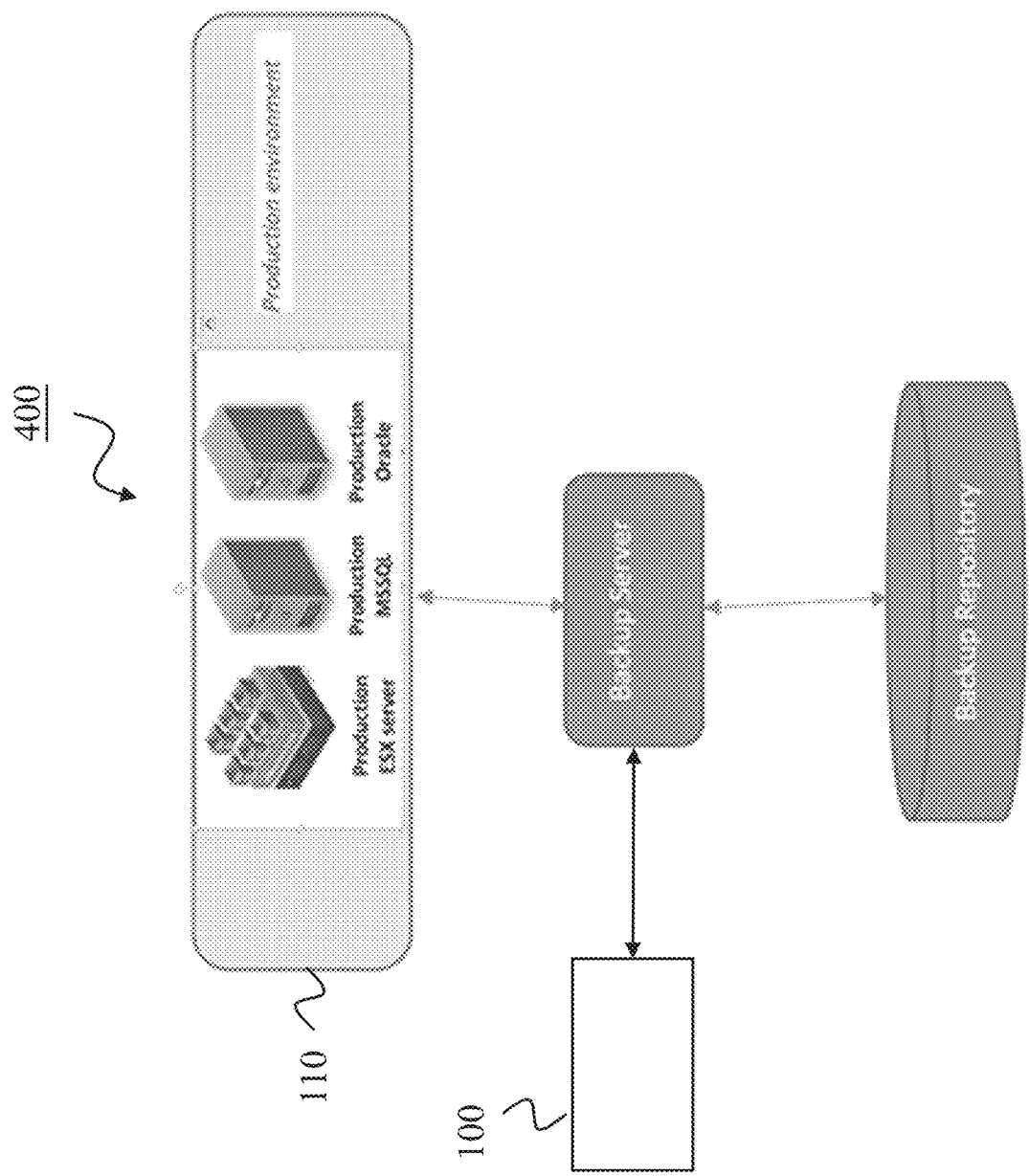
FIG. 4 shows a system overview according to an embodiment of the invention.

FIG. 4 shows a backup system 400 according to an embodiment of the invention. The system 400 comprises a backup entity 100. In particular, the backup entity 100 shown in FIG. 4 may be the backup entity 100 shown in FIG. 1. In particular, the backup system further comprises a backup repository. Notably, same elements in all figures are labelled with the same reference signs and function likewise.

According to an embodiment of the invention, the backup system 400 may further comprise a production device 110, where the production device 110 shown in FIG. 4 may be the production device 110 shown in FIG. 1. Generally, the production device 110 may be a device that can be directly accessed by the user, and comprising user data (also named as production system in implementations).

Optionally, according to an embodiment of the invention, the production device 110 may be configured to create the first snapshot of the disk volume, before the first operation 1111 is performed.

Optionally, according to an embodiment of the invention, the production device 110 may be further configured to perform the first operation 1111 on the disk volume. Then, the production device 110 may be configured to create the second snapshot of the disk volume after the first operation 1111 is performed.

Figure 5:
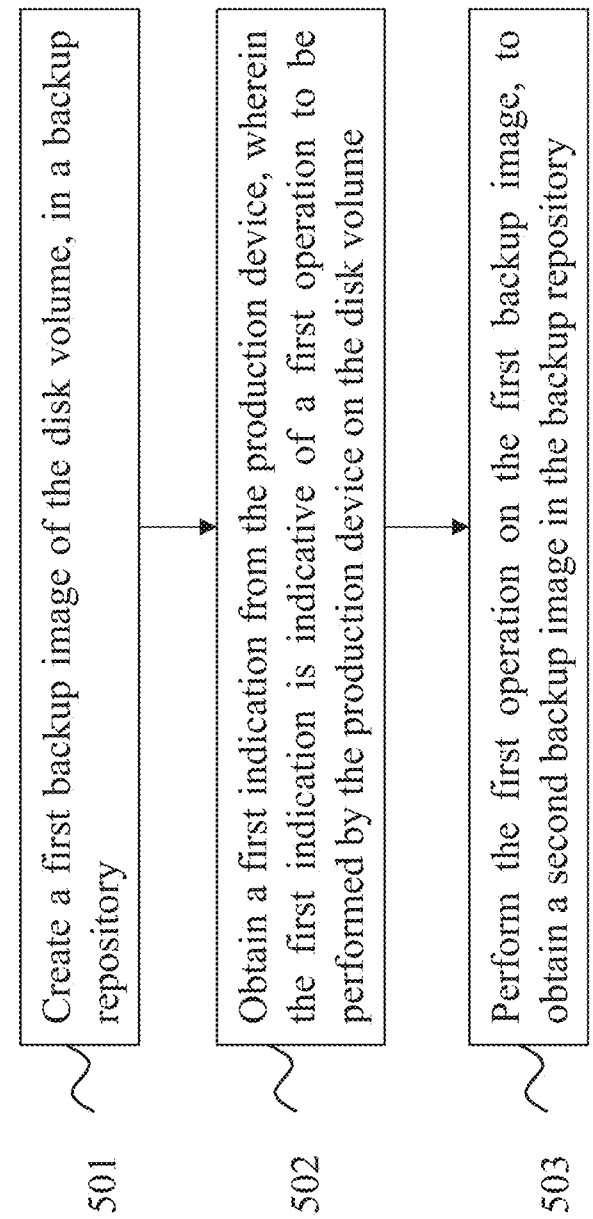
FIG. 5 shows a method according to an embodiment of the invention.

FIG. 5 shows a method 500 for backing up a disk volume according to an embodiment of the invention. In particular, the disk volume is of a production device 110. In a particular embodiment of the invention, the method 500 is performed by a device 100 shown in FIG. 1 or FIG. 4. The method 500 comprises: a step 501 of creating a first backup image 101 of the disk volume, in a backup repository; a step 502 of obtaining a first indication 111 from the production device 110, wherein the first indication 111 is indicative of a first operation 1111 to be performed by the production device 110 on the disk volume; and a step 503 of performing the first operation 1111 on the first backup image 101, to obtain a second backup image 102 in the backup repository.

Notably, the method 500 may further comprise actions as described in aforementioned embodiments of the backup entity 100.

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the backup entity 100 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the backup entity 100 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A backup entity for backing up a disk volume, wherein the disk volume is of a production device, and the backup entity comprises:
    a memory having processor-executable instructions stored thereon; and
    a processor coupled to the memory and configured to execute the processor-executable instructions to:
    create a first backup image, of the disk volume, in a backup repository;
    obtain a first indication from the production device, wherein the first indication indicates a first operation to be performed by the production device on the disk volume; and
    perform the first operation on the first backup image, to obtain a second backup image in the backup repository, wherein the first operation comprises one of the following operations:
    disk encryption, program upgrade, disk defragmentation, and application maintenance.

2. The backup entity according to claim 1, wherein the processor is further configured to:
    obtain a first snapshot of the disk volume from the production device; and
    backup the first snapshot to create the first backup image of the disk volume in the backup repository.

3. The backup entity according to claim 1, wherein the processor is further configured to:
    perform chunking on the second backup image to obtain a first set of chunks; and
    determine a hash value for each chunk in the first set of chunks, to obtain a first set of hash values.

4. The backup entity according to claim 3, wherein the processor is further configured to:
    obtain, after the first operation is performed by the production device, a second snapshot of the disk volume from the production device,
    perform chunking on the second snapshot to obtain a second set of chunks; and
    determine a hash value for each chunk in the second set of chunks, to obtain a second set of hash values.

5. The backup entity according to claim 4, wherein performing the chunking on the second snapshot comprises:

instructing the production device to perform the chunking on the second snapshot, to obtain the second set of chunks.

6. The backup entity according to claim 4, wherein the processor is further configured to:
compare the first set of hash values and the second set of hash values;
determine a third set of hash values, wherein the third set of hash values comprises hash values that are in the second set of hash values but are not in the first set of hash values; and
add chunks associated with the hash values in the third set of hash values to the second backup image, to obtain a third backup image in the backup repository.

7. The backup entity according to claim 1, wherein:
the backup entity comprises an application installed on the production device; and
wherein the processor is further configured to receive the first indication through the application.

8. The backup entity according to claim 1, wherein the first indication comprises an encryption key and an encryption algorithm.

9. A backup system comprising:
a backup repository; and
a backup entity for backing up a disk volume, wherein the disk volume is of a production device, and the backup entity comprises:
a memory having processor-executable instructions stored thereon; and
a processor coupled to the memory and configured to execute the processor-executable instructions to:
create a first backup image, of the disk volume, in the backup repository;
obtain a first indication from the production device, wherein the first indication indicates a first operation to be performed by the production device on the disk volume; and
perform the first operation on the first backup image, to obtain a second backup image in the backup repository, wherein the first operation comprises one of the following operations: disk encryption, program upgrade, disk defragmentation, and application maintenance.

10. The backup system according to claim 9, further comprising the production device.

11. The backup system according to claim 10, wherein the production device is configured to:
create a first snapshot of the disk volume, before the first operation is performed.

12. The backup system according to claim 11, wherein the production device is further configured to:
perform the first operation on the disk volume; and
create the second snapshot of the disk volume after the first operation is performed.

13. A method for backing up a disk volume, wherein the disk volume is of a production device, and the method which is implemented by a processor of a backup entity comprises:
creating a first backup image, of the disk volume, in a backup repository;
obtaining a first indication from the production device, wherein the first indication indicates a first operation to be performed by the production device on the disk volume; and
performing the first operation on the first backup image, to obtain a second backup image in the backup repository, wherein the first operation comprises one of the following operations: disk encryption, program upgrade, disk defragmentation, and application maintenance.

14. A non-transitory computer-readable medium comprising a program code which is executed by a processor and causes the processor to implement the method according to claim 13.

15. The method according to claim 13, further comprising:
obtaining a first snapshot of the disk volume from the production device; and
backing up the first snapshot to create the first backup image of the disk volume in the backup repository.

16. The method according to claim 13, further comprising:
performing chunking on a second backup image to obtain a first set of chunks; and
determining a hash value for each chunk in the first set of chunks, to obtain a first set of hash values.

17. The method according to claim 16, further comprising:
obtaining, after the first operation is performed by the production device, a second snapshot of the disk volume from the production device,
performing chunking on the second snapshot to obtain a second set of chunks; and
determining a hash value for each chunk in the second set of chunks, to obtain a second set of hash values.

18. The method according to claim 17, wherein performing the chunking on the second snapshot comprises:
instructing the production device to perform the chunking on the second snapshot, to obtain the second set of chunks.

19. The method according to claim 17, further comprising:
comparing the first set of hash values and the second set of hash values;
determining a third set of hash values, wherein the third set of hash values comprises hash values that are in the second set of hash values but are not in the first set of hash values; and
adding chunks associated with the hash values in the third set of hash values to the second backup image, to obtain a third backup image in the backup repository.

* * * * *